United States Patent [19]

Satoh et al.

[11] Patent Number: 4,549,163

[45] Date of Patent: Oct. 22, 1985

[54] SLIP INDICATING SYSTEM FOR A FOUR-WHEEL DRIVE VEHICLE

[75] Inventors: Tetsuo Satoh, Ohta; Masaaki Ohgami, Musashino; Shoji Ogata, Ohta, all of Japan

[73] Assignee: Fuji Jukogyo Kabushiki Kaisha, Tokyo, Japan

[21] Appl. No.: 322,342

[22] Filed: Nov. 18, 1981

[30] Foreign Application Priority Data

Nov. 25, 1980 [JP] Japan .................. 55-166226

[51] Int. Cl.⁴ ......................................... G08B 21/00
[52] U.S. Cl. .......................... 340/52 R; 340/681; 180/197; 324/161; 324/168
[58] Field of Search ............. 340/52 R, 62, 681; 180/197, 313; 324/161, 168

[56] References Cited

U.S. PATENT DOCUMENTS

| | | | |
|---|---|---|---|
| 3,197,733 | 7/1965 | Cowie | 340/52 R |
| 3,893,535 | 7/1975 | Burckhardt et al. | 180/197 |
| 3,912,034 | 10/1975 | Pallof | 340/62 |
| 4,031,509 | 6/1977 | Matulevich | 340/681 |
| 4,066,300 | 1/1978 | Devlin | 324/161 |

Primary Examiner—Glen R. Swann, III
Attorney, Agent, or Firm—Martin A. Farber

[57] ABSTRACT

Speed detectors are provided for detecting speeds of each of the four wheels of a vehicle. An electric circuit is provided to compare the speeds of all wheels and to turn on at least one lamp when a difference between individual wheel speeds is detected, whereby slipping of wheels is indicated.

8 Claims, 4 Drawing Figures

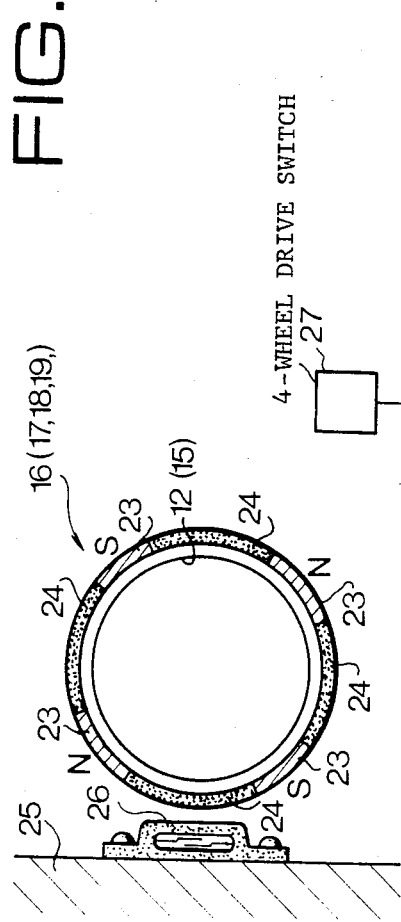
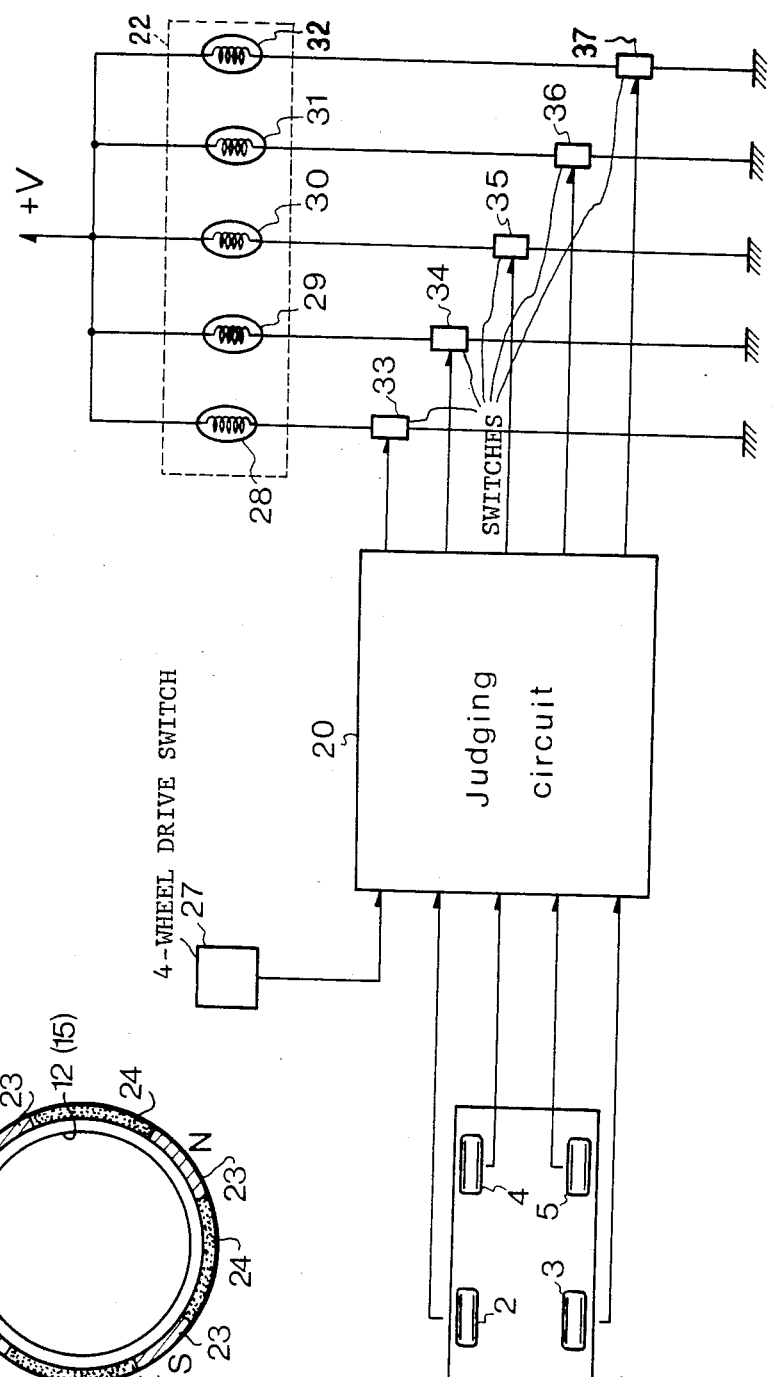

SLIP INDICATING SYSTEM FOR A FOUR-WHEEL DRIVE VEHICLE

BACKGROUND OF THE INVENTION

The present invention relates to a four-wheel drive vehicle and more particularly to a system for indicating slipping of each driving wheel of the vehicle.

The four-wheel drive vehicle is useful to travel on slippery roads such as snowy and icy roads. However, if any one of the four wheels slips on such a slippery road, it is difficult to start the vehicle. The driver must get out of the vehicle when slipping occurs and inspect which wheel slips. The slipping of a wheel may be stopped by changing the position of the passengers or the load on the vehicle.

SUMMARY OF THE INVENTION

Accordingly, it is an object of the present invention to provide a slip indicating system for a four-wheel drive vehicle which detects the revolution speed of each wheel and indicates automatically which wheel is slipping by a difference between wheel speeds.

According to the present invention, there is provided a slip indicating system for a four-wheel drive vehicle comprising a speed detector for detecting the speed of each wheel individually, means for comparing the speeds detected by the speed detectors and for producing outputs in accordance with the difference between the speeds, switch units adapted to be closed by said outputs, and indicators adapted to be operated by closing of the switch units.

BRIEF DESCRIPTION OF DRAWINGS

FIG. 2 is a sectional view showing a wheel speed detector;

FIG. 3 is a block diagram showing an indicating system; and

DETAILED DESCRIPTION OF THE PREFERRED EMBODIMENTS

Figure 1:
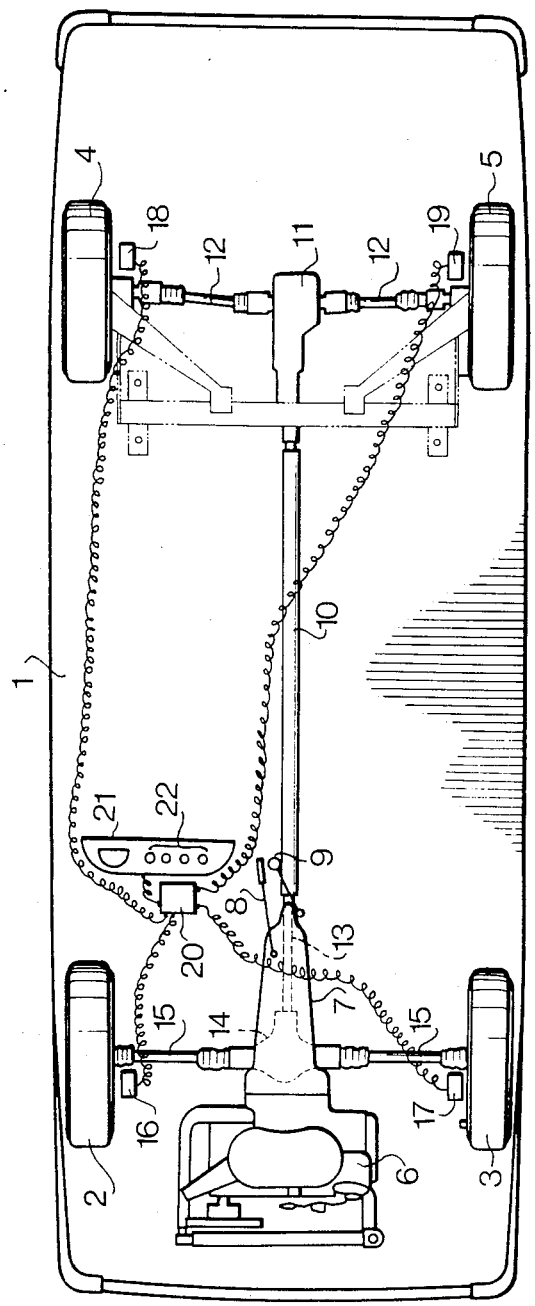
FIG. 1 is a plan view showing a four-wheel driving system provided with a system of the present invention.

Referring to FIG. 1, a vehicle has a body 1, front wheels 2 and 3 and rear wheels 4 and 5. An engine 6 is mounted on the body 1 at a front portion thereof. Power of the engine is transmitted to the front wheels through a transmission 7 and respectively to both of the front and rear wheels by engaging a clutch provided in the transmission 7. Gear change of the transmission is performed by operating a change speed lever 8. The clutch in the transmission 7 is engaged by operating a select lever 9 for transmitting the power also to the rear wheels 4, 5. The output of the transmission 7 is transmitted to the front wheels 2, 3 through a shaft 13, a front differential 14 and front axles 15. The power transmission to the rear wheels 4, 5 comprises a propeller shaft 10 extending from the transmission 7, a rear differential 11 and rear axles 12.

In order to detect the rotational speed of the front and rear wheels 2, 3, front-wheel speed detectors 16, 17 are provided adjacent to axles 15 and rear wheels speed detectors 18, 19 are provided adjacent to axles 12. The output of each speed detector is connected to a judging circuit 20, the output of which is connected to an indicator 22 such as lamps on an instrument panel 21 (FIG. 1) for individually indicating slipping of respective any one of the four wheels.

Referring to FIG. 2 showing one of the speed detectors 16 to 19, a plurality of permanent magnets 23 are circumferentially arranged on the axle 12 (or on the axle 15) and secured thereto. The magnets 23 are separated from each other by synthetic resin 24 or other insulation secured on the axle. The magnets 23 are arranged to alternate North and South poles. A reed switch 26 is provided on a support 25 formed on the body 1 and positioned in the vicinity of the magnets 23 with a slight gap therefrom.

FIG. 3 shows the indicating system according to the present embodiment.

Output signals from the speed detectors for the wheels are applied to the judging circuit 20. A four-wheel drive switch 27 is also connected with the judging circuit 20. The four-wheel drive switch 27 is actuated by the select lever 9 of the above-mentioned clutch and turned on during the four-wheel drive operation. The indicator 22 contains a slip indicating lamp 28, and four individual slipping wheel indicating lamps 29, 30, 31, 32 corresponding to the individual wheels 2, 4, 5, 3, respectively. The lamps 28 to 32 are connected in series with respective switch elements 33, 34, 35, 36, 37 which are connected to the control output of the judging circuit 20.

Figure 4:
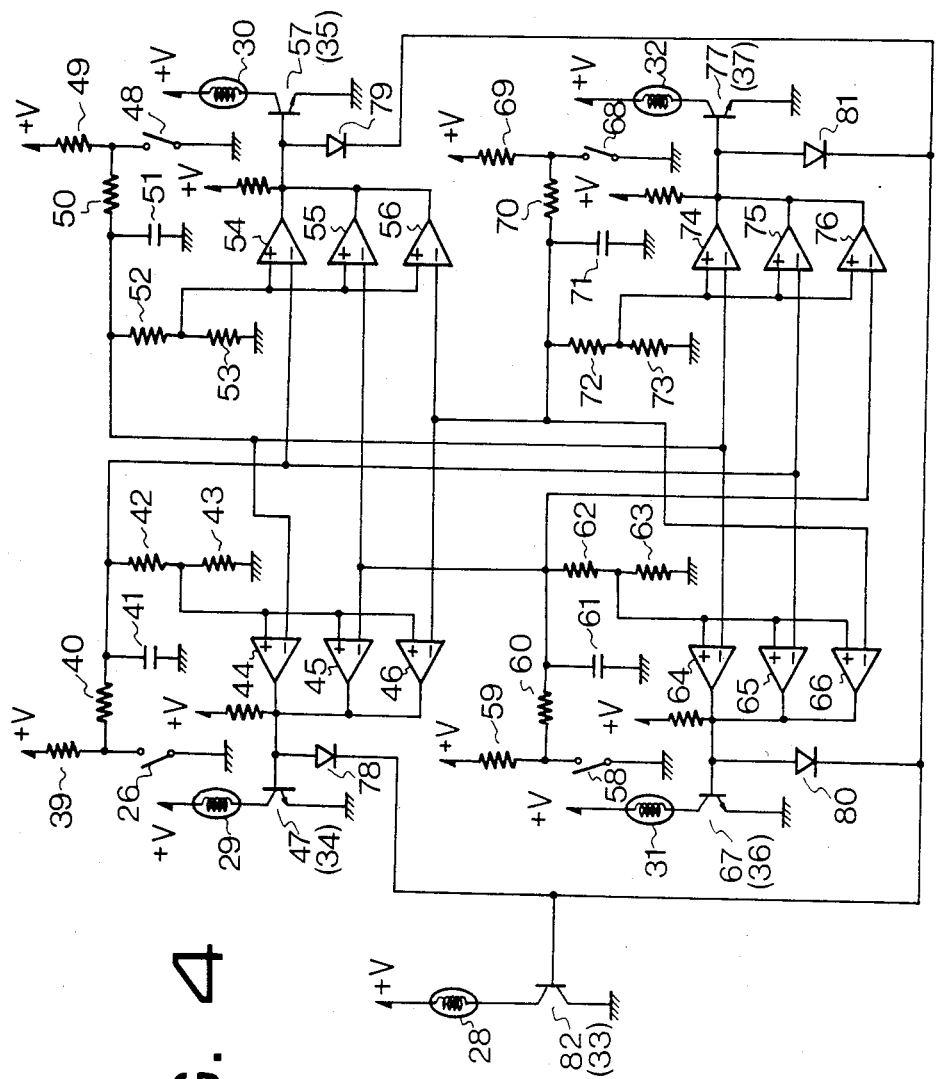
FIG. 4 is an electric circuit used in the system of the present invention.

FIG. 4 is a detailed electric circuit of the indicating system shown in FIG. 3.

Positive electric voltage is applied through a resistor 39 to the reed switch 26 in the speed detector 16. The reed switch 26 is connected to an integrating circuit consisting of a resistor 40 and a capacitor 41, and the resistor 40 is connected to a voltage divider consisting of resistors 42 and 43. The divided voltage is applied to non-inverting inputs of comparators 44, 45, 46 and outputs of the comparators 44 to 46 are connected to the base of a transistor 47 which corresponds to the switch element 34 in FIG. 3. The emitter of the transistor 47 is grounded and the collector is connected to the slipping wheel indicating lamp 29. These parts constitute a first unit of a slip indicating circuit for the front wheel 2. There are three other units for the other wheels with similar constitution: namely, a second unit actuated by a reed switch 48 in the speed detector 18; a third unit actuated by a reed switch 58 in the speed detector 19; and a fourth unit actuated by a reed switch 68 in the speed detector 17. Voltage at the resistor 40 of the first unit is applied to comparators 54, 65, 75 of each of the other units; similarly the voltage at a resistor 50 of the second unit is applied to comparators 44, 64, 74 of the other units; the voltage at a resistor 60 of the third unit is applied to comparators 45, 55, 76 of the other units; and the voltage at a resistor 70 of the fourth unit is applied to comparators 46, 56, 66 of the other units. Outputs of the comparators 44–46, 54–56, 64–66 and 74–76 are applied through diodes 78–81 respectively to the base of a transistor 82 which corresponds to the switch element 33, the emitter of which is grounded, and the collector of which is connected to the slip indication lamp 28.

The function of the present invention will be explained.

When the four-wheel drive is selected by operating the select lever 9, engine power is transmitted to the front and rear wheels 2, 3, 4, 5 through the shaft 13, propeller shaft 10 and axles 12, 15 to achieve four-wheel drive. When the wheels 2–5 begin to rotate, the magnets 23 of each speed detector rotates together with the respective axle. Because of the rotation of the magnets 23, the reed switch 26 (48, 58, 68) of each speed detector is turned on and off to cause a voltage variation at the output of each integrating circuit in dependency on the number occurrences of on-off of the switch. A voltage depending on the wheel speed of each wheel is applied to each of the comparators 44–46, 54–56, 64–66 and 74–76. As long as all wheels rotate at the same speed, the voltages at the capacitors 41, 51, 61, 71 are substantially equal to each other. Thus, each comparator of each unit is applied at the non-inverting input with a voltage lower than the voltage at the inverting input, so that the output of the each comparator is negative. Thus, transistors 47, 57, 67, 77 (as the switches 34, 35, 36, 37) remain off, and therefore, none of the slipping wheel indicating lamps 29–32 and slip indicating lamp 28 are turned on.

If for example the front wheel 2 slips, its wheel speed increases rapidly. Thus, the terminal voltage of the capacitor 41 of the integrating circuit becomes higher; and consequently the voltage applied to the non-inverting inputs of the comparators 44–46 becomes higher than the inverting terminal voltages applied from the other capacitors 51, 61, 71. Accordingly, the comparators 44–46 produce a positive voltage to turn on the transistor 47, so that the slipping wheel indicating lamp 29 is turned on. Thus, slipping of the front wheel 2 is indicated. Similarly, the output from comparators 44–46 turns on the transistor 82 through a diode 78 to turn on the slip indicating lamp 28 indicating that one of the wheels is slipping. This operation is performed similarly on each of other wheels 3–5. Accordingly, the driver readily knows which wheel is slipping. The slipping of the wheel may be stopped by changing the position of the passengers or the loads on the vehicle.

According to the present invention, the driver finds out which wheel is slipping so that the vehicle can be easily moved on slippery roads, such as snowy or muddy roads.

What is claimed is:

1. In an indicating system for a four wheel motor vehicle having axle shafts respectively connected with the wheels of said vehicle, the improvement comprising
   a plurality of speed detecting means, one of which is operatively mounted with respect to one each of said axle shafts for detecting speed of an associated wheel and providing a speed signal representative of the detected speed,
   a plurality of comparing circuit means, each of said comparing circuit means being individually connected with an associated one of said speed detecting means for comparing the speed signal of said associated speed detecting means separately with the speed signals from each of all of the others of said speed detecting means and for generating an output signal when the speed of the associated wheel of the vehicle is higher than the speed of at least one of the other wheels, and
   a plurality of slipping wheel indicating means, each of said slipping wheel indicating means being individually associated with an associated one wheel so as to be recognizable to an occupant of the vehicle as associated with the said associated one wheel and being individually connected with an associated one of said comparing circuit means for indicating a slipping of said associated wheel in response to said output signal of said associated comparing circuit means.

2. The indicating system for a four wheel motor vehicle in accordance with claim 1, further comprising
   a slip indicating means operatively connected with outputs of all of said comparing circuit means for indicating a slipping condition of any of said wheels in response to any one of said output signals of any of said comparing circuit means.

3. The indicating system for a four wheel motor vehicle in accordance with claim 1, wherein
   each of said speed detecting means comprises a pulse generator means for producing pulses in proportion to speed of the associated wheel, and
   said comparing circuit means for each associated wheel comprises an integrating circuit for integrating said pulses and comparators for comparing an output of said integrating circuit with respective outputs of others of said integrating circuits of the others of said comparing circuit means for the others of said wheels.

4. The indicating system for a four wheel motor vehicle in accordance with claim 1, wherein
   said plurality of slipping wheel indicating means are located in an instrument panel of the vehicle and are associated with respective wheels for recognition.

5. The indicating system for a four wheel motor vehicle in accordance with claim 1, wherein
   each said indicating means comprises a switch and a lamp connected in series, said switch being responsive to said output signal of said associated comparing circuit means.

6. The indicating system for a four wheel motor vehicle in accordance with claim 5, further comprising
   a slip indicating means operatively connected with outputs of all of said comparing circuit means for indicating a slipping condition of any of said wheels in response to any one of said output signals of any of said comparing circuit means,
   said slip indicating means comprising a switch and a lamp connected in series, and wherein
   diodes poled in a direction towards said latter-mentioned switch connect the latter with the outputs of all of said comparing circuit means.

7. The indicating system for a four wheel motor vehicle in accordance with claim 6, wherein
   all of said lamps are located in an instrument panel of the vehicle.

8. In an indicating system for a four wheel motor vehicle having axle shafts respectively connected with the wheels of said vehicle, the improvement comprising
   a plurality of speed detecting means, one of which is operatively mounted with respect to one each of said axle shafts for detecting speed of an associated wheel and providing a speed signal representative of the detected speed,
   a plurality of comparing circuit means, each of which is individually connected with an associated one of said speed detecting means for comparing the speed signal of said associated speed detecting means with the speed signals from the others of said speed detecting means and for generating an output signal when the speed of the associated wheel of the vehicle is higher than the speed of at least one of the other wheels, and
   a plurality of slipping wheel indicating means, each of which is individually associated with an associated one wheel and is individually connected with an associated one of said comparing circuit means for indicating a slipping of said associated wheel in response to said output signal of said associated comparing circuit means.

* * * * *